United States Patent [19]

Grigo et al.

[11] 4,370,450

[45] Jan. 25, 1983

[54] PROCESS FOR THE PRODUCTION OF POLAR-MODIFIED POLYPROPYLENE AND ITS USE

[75] Inventors: Ulrich Grigo, Krefeld; Josef Merten, Korschenbroich; Rudolf Binsack, Krefeld, all of Fed. Rep. of Germany

[73] Assignee: Bayer Aktiengesellschaft, Leverkusen, Fed. Rep. of Germany

[21] Appl. No.: 266,949

[22] Filed: May 26, 1981

[30] Foreign Application Priority Data

Jun. 4, 1980 [DE] Fed. Rep. of Germany ....... 3021105

[51] Int. Cl.$^3$ .......................................... C08F 255/02
[52] U.S. Cl. .................................... 525/262; 524/547; 524/556; 524/562; 525/242; 525/285; 525/286; 525/288; 525/296; 525/297; 525/301; 525/309
[58] Field of Search ................................ 525/262, 265

[56] References Cited

U.S. PATENT DOCUMENTS

| | | | |
|---|---|---|---|
| 3,290,415 | 12/1966 | Tanner | 525/276 |
| 3,347,692 | 10/1967 | Young et al. | 525/301 |
| 3,652,730 | 3/1972 | Favie et al. | 525/265 |
| 3,862,266 | 1/1975 | McConnell et al. | 525/262 |
| 3,882,194 | 5/1975 | Krebaum et al. | 525/285 |
| 4,078,017 | 3/1978 | Nagatoshi et al. | 525/265 |
| 4,080,405 | 3/1978 | Agouri et al. | 260/878 R |
| 4,097,554 | 6/1978 | Yui et al. | 525/265 |

FOREIGN PATENT DOCUMENTS

| | | | |
|---|---|---|---|
| 2455594 | 5/1976 | Fed. Rep. of Germany | 525/265 |
| 1442527 | 7/1976 | United Kingdom . | |

*Primary Examiner*—Stanford M. Levin
*Attorney, Agent, or Firm*—Connolly and Hutz

[57] ABSTRACT

A process for the production of modified polypropylene particles by polymerizing vinyl monomers in aqueous suspension wherein (a) an aqueous suspension is prepared which, based on 100 to 2000 parts by weight of water, contains 100 parts by weight of polypropylene particles, 4 to 30 parts by weight of a polar vinyl monomer and based on 100 parts by weight of the monomer, 0.1 to 10 parts by weight of a radical chain polymerization initiator which has a half life of at least 2 h at a temperature of 80° to 135° C. and 10 to 1200 parts by weight of an organic solvent which is capable of swelling polypropylene, of which the boiling point at 760 Torr is at least 100° C. and which is miscible with the monomers in any proportion; (b) the aqueous suspension is heated without decomposition of the initiator, the polypropylene being swollen and the monomer penetrating into the polypropylene, after which (c) the aqueous suspension is kept at temperatures of ≧85° C. until polymerization of the monomer has ceased. The modified polypropylene is used to improve the mechanical properties of unmodified, optionally glass-fibre-reinforced polypropylene.

5 Claims, No Drawings

PROCESS FOR THE PRODUCTION OF POLAR-MODIFIED POLYPROPYLENE AND ITS USE

This invention relates to a process for the production of polar-modified polypropylene by polymerizing polar, vinyl monomers on or in the surface of polypropylene particles swollen by organic solvents and to the use of this polypropylene.

In order to improve mechanical properties, such as rigidity, flexural strength, tensile strength, impact strength, dimensional stability, and other properties of glass-fibre-reinforced or filled polypropylene, at least part of the polypropylene has to be modified such that improved adhesion is obtained between the reinforcing material and the matrix.

One way of modifying polypropylene is to graft-polymerize suitable monomers in the presence of polypropylene under the influence of high-energy radiation. Although some of these processes, which are described, for example, in U.S. Pat. Nos. 3,290,415 and 3,347,692, are extremely effective, they have never acquired any commercial significance because they require the use of special apparatus for carrying out the graft polymerization reaction under irradiation which is both an economic and technical problem.

Processes in which polypropylene is grafted in molten form in the presence of radical initiators are also known (cf. German Offenlegungsschrift No. 24 26 972 and U.S. Pat. No. 3,882,194). However, these processes involve the difficulty that, in molten form, polypropylene is readily degraded by radical attack into products of low molecular weight.

It is also known that the graft-polymerization of polypropylene can be carried out in solution using a solvent, such as xylene or chlorobenzene.

On account of the poor solubility of polypropylene in these solvents, the polymerization reaction can only be carried out in a dilute solution. This process is attended by the disadvantage that only relatively low degrees of grafting are achieved.

In addition, it is known from German Offenlegungsschrift No. 26 58 681 that vinyl monomers can be polymerized in an aqueous dispersion system in the presence of polypropylene paticles and wetting agents. In this case, the polymerization reaction tends to take place for the most part on the surface only because the polypropylene is not swollen by the polar monomers, for example acrylamide and acrylates, etc. However, this known process does enable high concentrations of polypropylene to be used because the viscosity of the aqueous dispersion is for the most part determined solely by the water.

In a similar process described in German Offenlegungsschrift No. 26 40 059, the polypropylene particles are impregnated in an aqueous suspension with the monomer at a temperature below the decomposition temperature of the radical initiator, followed by grafting at elevated temperatures. The graftable monomers used are vinyl monomers, such as styrene and derivatives thereof, alkyl (meth) acrylates, acrylonitrile, acylamide, maleic acid anhydride and mixtures of styrene with the other monomers mentioned. The object of impregnating the polypropylene particles beforehand with the monomer is to increase the degree of grafting and to obtain a graft polymerization reaction which does not take place solely on the surface of the polypropylene particles. However, the polypropylene particles can only be impregnated with monomers, such as styrene and styrene derivatives. Polar monomers, such as acrylates, acrylonitrile, acrylamide and maleic acid anhydride, do not swell polypropylene. Accordingly, they are used in admixture with a swellable monomer, such as styrene, styrene having to be present in the mixture in a considerable excess in order to obtain swelling of the polypropylene. The disadvantage of this process is that polar monomers can only be grafted onto polypropylene together with an excess of apolar monomers, which leads to mixed graft polymers containing relatively little polar graft monomer.

The object of the present invention is to produce homogeneous polypropylene graft polymers containing grafted-on units of only polar monomers.

According to the invention, this object is achieved in that, starting with the process according to German Offenlegungsschrift No. 26 40 059, the polypropylene is swollen with an organic solvent suitable for this purpose and which contains the polar monomers. The polar monomers are able to penetrate into the swollen polypropylene and enable relatively high degrees of grafting of the polar monomers to be obtained.

Accordingly, the present invention relates to a process for the production of modified polypropylene particles by polymerizing vinyl monomers in aqueous suspension wherein:

(a) an aqueous suspension is prepared which, based on 100 to 2000 parts by weight of water, contains 100 parts by weight of polypropylene particles and 4 to 30 parts by weight of a vinyl monomer and, based on 100 parts by weight of the monomer, 0.1 to 10 parts by weight of a radical-chain-polymerization initiator which has a half life of at least 2 h at a temperature of 80° to 135° C.

(b) the aqueous suspension is heated without decomposition of the initiator, the polypropylene being swollen and the monomer penetrating into the polypropylene, after which (c) the aqueous suspension is kept at temperatures of $\geq 85°$ C. until polymerisation of the monomer has ceased, and which is characterized in that the vinyl monomer is a polar vinyl monomer and in that the aqueous suspension additionally contains 30 to 1200 parts by weight, based on 100 parts by weight of the monomer, of an organic solvent which is capable of swelling polypropylene, of which the boiling point at 760 Torr is at least 100° C. and which is miscible with the monomers in any proportions.

The process according to the invention not only has the advantage of swelling polypropylene by the addition of the organic solvent, thus enabling the polar monomer to penetrate into the polypropylene, but also it permits introduction of virtually any monomer concentrations highly homogeneously onto or into the polypropylene particles by variable adjustment of the monomer-to-solvent ratio. To obtain substantially homogeneous distribution of the polar monomer in the polypropylene, it is essential to use organic solvents which are capable of swelling polypropylene, even at temperatures distinctly below the decomposition temperature of the radical initiator. In addition, the organic solvents should be completely miscible with the polar monomers. The boiling points of the organic solvents should amount to at least 100° C. at 760 Torr to prevent any distillation from occuring during the polymerization reaction. On the other hand, the boiling points should not be too high either to enable the organic solvents to be readily removed during drying of the grafted polypropylene particles.

Suitable solvents are aromatic hydrocarbons, aliphatic hydrocarbons and halogenated aromatic hydrocarbons having boiling points at 760 Torr in the range from 100° C. to 250° C. and preferably in the range from 110° C. to 160° C., and mixtures thereof. Examples of such solvents are toluene, xylene, chlorobenzene, dichlorobenzene, cyclohexanone, diethylene glycol diethyl ether and di-n-butyl ether.

It is preferred to use toluene, xylene, chlorobenzene and dichlorobenzene.

The organic solvent is used in a quantity of from 30 to 1200 parts by weight and preferably in a quantity of from 20 to 500 parts by weight, based on 100 parts by weight of the polar monomers.

In the context of the invention, polypropylene is understood to include both crystalline homopolypropylene and also crystalline copolymers of copolymerized units of at least 70% by weight of propylene and one other α-olefin, preferably ethylene.

The polypropylene particles should preferably be present in the form of a powder having a mean particle size of from 10 to 2000 nm and a specific surface of from 0.1 to 10 m$^2$/g in order to achieve rapid and complete impregnation of the polypropylene particles with the solvent or rather the monomer.

The process according to the invention is suitable for the graft polymerization of polar vinyl monomers, such as $C_1$–$C_7$-alkyl acrylates, $C_1$–$C_7$-alkyl methacrylates, acrylonitrile, acrylamide, acrylic acid, methacrylic acid and/or maleic acid anhydride, onto polypropylene. Vinyl monomers, such as acrylic acid, glycidyl methacrylate and γ-methacryoyloxy propyl trimethoxy silane, have proved to be particularly suitable.

According to the invention, the vinyl monomer is used in a quantity of from about 4 to 30 parts by weight based on 100 parts by weight of the propylene polymer. If quantities exceeding 30 parts by weight are used, only part of the monomer is capable of penetrating into the polypropylene, so that in addition to graft copolymer, a relatively large proportion of vinyl homopolymer is formed during the polymerization reaction. The homogeneity of the particles decreased with increasing proportion of homopolymer in the graft copolymer. Where quantities below 4 parts by weight of vinyl monomer are used, the properties of the graft copolymer are barely affected.

The polymerization initiator used in the process according to the invention should be soluble in the organic solvent and in the graft monomer, but insoluble in water because the polymerization reaction is carried out in aqueous suspension.

The decomposition temperature of the polymerization initiator used should advantageously amount to between 85° C. and 135° C. for a half life of 2 hours. If the initiator used has a decomposition temperature below 80° C., the polymerization reaction actually takes place during the swelling or impregnation phase so that a homogeneous graft copolymer is not obtained.

Typical examples of polymerization initiators which are suitable for use in the process according to the invention are dibenzoyl peroxide, tert.-butyl peroxide-2-ethyl hexoate, tert.-butylperoxy diethyl acetate and tert.-butylperoxyisobutyrate.

The polymerization initiator is generally used in a quantity of from about 0.1 to 10 parts by weight based on 100 parts by weight of vinyl monomer. If the initiator is used in a quantity of less than 0.1% by weight, the vinyl monomer is incompletely polymerized. If the quantity is larger than about 10 parts by weight, residues of undecomposed polymerization initiator are in danger of remaining in the graft copolymer and thus adversely affected its processing behaviour. In order to obtain complete decomposition of the polymerization initiator, the polymerization time should amount to at least 5 half lives of the polymerization initiator.

The aqueous suspension is prepared by first homogeneously mixing the polypropylene powder with the corresponding quantity of solvent, monomer and polymerization initiator. The resulting mixture is stirred into water into which a suspending agent, such as polyvinyl alcohol or methyl cellulose for example, has been dissolved in the usual amount.

The concentration of the polypropylene particles in the aqueous suspension is not subject to any particular limits, provided that the system may be stirred without difficulty. Normally, the suspension contains from 100 to 2000 parts by weight and preferably from 200 to 1000 parts by weight of water based on 100 parts by weight of polypropylene. The aqueous suspension is first stirred for several hours at a temperature below the decomposition temperature of the polymerization initiator, preferably at 40° to 85° C. During this first step, the polypropylene particles are swollen by the organic solvent so that, at the same time, the vinyl monomer is capable of penetrating into the polypropylene together with the polymerization initiator. Polymerization is then carried out at a temperature in the range from 85° C. to 150° C. At temperatures of up to 100° C., the polymerization reaction may be carried out under normal pressure whereas, at temperatures above 100° C., the reaction has to be carried out under pressure. The temperature does not have to be constant during the polymerization reaction, but instead may be varied or increased in stages.

The polymerization time is normally between about 3 and 12 hours.

The shape of the polypropylene particles and the viscosity of the suspension remain virtually unchanged throughout the polymerization reaction. On completion of polymerization, the polymerization mixture obtained is cooled and then further treated in the same way as it would be had polymerization been carried out in the usual way in aqueous suspension. The copolymer produced in accordance with the invention is distinguished by the fact that, in the polypropylene graft copolymer of substantially spherical particles, the graft branches are present not only on the surface of the particles, but also, as a result of swelling, in the polypropylene particles.

Thus, by using a suitable solvent for swelling, it is possible consistently to obtain higher degrees of grafting than in the case of graft polymerization reactions carried out in the absence of a solvent (cf. Table 1).

The polar-modified polypropylene particles are particularly suitable for addition (in quantities of from about 1 to 50% by weight and preferably in quantities of from 3 to 20% by weight, based on the total mixture) to glass-fibre- and filler-containing polypropylene, resulting in improved adhesion between filler or glass fibre and matrix. Polypropylene compounds modified in this way show considerably greater flexural strength and impact strength by comparison with unmodified polypropylene compounds. Furthermore, additions of polar-modified polypropylene to unmodified polypropylene improve its affinity for lacquering and printing. Additions of polar-modified polypropylene improve the polypropylene/rubber coupling in mixtures of polypropylene with polar rubbers, such as ethylene/vinyl acetate copolymers, acrylonitrilebutadiene rubbers and acrylate rubbers, etc.

The parts and percentages quoted in the following Examples are by weight unless otherwise indicated. The letters PP represent polypropylene.

EXAMPLE 1

100 g of polypropylene powder, which have been homogeneously mixed with 10 parts of n-butyl acrylate, 30 parts of chlorobenzene and 0.5 g of benzoyl peroxide, are added with stirring under nitrogen to 300 ml of water to which 1.5 g of emulsifier have been added. The suspension is stirred for 2 hours at 60° and for 4 hours at 90° C. to 95° C. After cooling, the grafted polypropylene powder is isolated by filtration under suction, washed with ethanol and dried at 60° C. in a water jet vacuum. The graft polymer obtained is similar in its appearance to the polypropylene used. It also has the same pouring behaviour. The quantity of n-butyl acrylate on the polypropylene may be determined by IR-spectroscopy or by oxygen analysis. Degree of grafting: 48%.

EXAMPLE 2

The procedure is as described in Example 1, except that 10 parts by t-butyl acrylate are used instead of 10 parts of n-butyl acrylate. Degree of grafting: 39%

EXAMPLE 3

The procedure is as described in Example 1, except that 10 parts of acrylic acid are used instead of n-butyl acrylate. Degree of grafting: 96%.

EXAMPLE 4

The procedure is as described in Example 1, except that a powder-form polypropylene copolymer containing approximately 3% by weight of ethylene in the form of copolymerized blocks is used instead of a polypropylene homopolymer. Degree of grafting: 47%.

EXAMPLE 5

The procedure is as described in Example 4, except that 10 parts of acrylic acid are used instead of 10 parts of n-butyl acrylate. Degree of grafting: 93%.

EXAMPLE 6

The procedure is as described in Example 1, except that 2 parts of methacrylic acid and 10 parts of chlorobenzene are used instead of 10 parts of n-butyl acrylate and 30 parts of chlorobenzene. Degree of grafting: 19%.

EXAMPLE 7

Polypropylene graft copolymers produced in the absence and presence of a swelling solvent under the same conditions as in Example 1 are set out in Table 1. The graft copolymers produced in the presence of chlorobenzene as the swelling solvent all have higher degrees of grafting than corresponding graft polymers produced in the absence of swelling solvents.

Graft copolymers produced with styrene as the swelling solvent in accordance with German Offenlegungsschrift No. 26 40 059 are also shown for comparison. They have distinctly lower degrees of grafting than graft copolymers produced using chlorobenzene.

The degrees of grafting were determined by heating a 1% solution of the polypropylene graft copolymer in xylene under reflux for 30 minutes. The hot solution is then introduced with stirring into the same quantity of cold ethyl acetate. The mixture obtained is left standing for 1 day at room temperature, the polypropylene graft copolymer precipitating. The precipitated product is filtered off, dried and examined for undissolved grafted fraction (IR-spectrum, oxygen analysis). The degree of grafting is defined as the ratio of the proportion of graft monomer left on the polypropylene after dissolution and reprecipitation to the proportion determined before dissolution and reprecipitation.

EXAMPLE 8

Selected mechanical properties of glass-fibre-reinforced polypropylene compounds are compared in Table 2. The compounds to which acrylic-acid-grafted PP has been added show a distinctly higher proptery level than a compound containing ungrafted polypropylene (compounds 2 and 3 by comparison with compound 1). However, comparison of compounds 2 and 3, both of which contain 10 parts of acrylic-acid-grafted polypropylene, with one another shows that compound 3 has much greater strength and notched impact strength than compound 2. Compound 3 contains acrylic-acid-grafted polypropylene which was grafted with an addition of organic solvent, whilst compound 2 contains acrylic-acid-grafted polypropylene which was grafted without the addition of an organic solvent.

The polypropylene grafted without the addition of an organic solvent used for compound 2 (Comparison Example) corresponds to the graft copolymer of Test 3 in Table 1 whilst the polypropylene grafted in the presence of chlorobenzene used for compound 3 (Example according to the invention) corresponds to the graft copolymer of Test 4 in Table 1.

TABLE 1

| | | | PP-graft copolymers | | | |
| | | | Proportion of graft monomer remaining on the PP | | | |
| | | | before dissolution | after dissolution and reprecipitation[2] | | |
| Test | PP-powder[1] parts | Graft monomer Quantity Type parts | % | % | Degree of grafting % | Swelling solvent: chlorobenzene |
|---|---|---|---|---|---|---|
| 1 | 100 (comparison) | 10 n-butyl acrylate | 8.2 | 1.3 | 16 | — |
| 2 | 100 (invention) | 10 n-butyl acrylate | 9.4 | 4.5 | 48 | 20 parts |
| 3 | 100 (comparison) | 10 acrylic acid | 8.5 | 5.2 | 61 | — |
| 4 | 100 (invention) | 10 acrylic acid | 9.2 | 9.0 | 98 | 20 parts |

TABLE 1-continued

| | | PP-graft copolymers | | | | |
|---|---|---|---|---|---|---|
| | | | Proportion of graft monomer remaining on the PP | | | |
| | | | before | after dissolution and reprecipitation[2] | Degree of grafting | Swelling solvent: chlorobenzene |
| Test | PP-powder[1] parts | Graft monomer Quantity Type parts | % | % | % | |
| 5 | 100 (comparison) | 10 methacrylic acid | 8.9 | 1.5 | 17 | — |
| 6 | 100 (invention) | 10 methacrylic acid | 9.4 | 3.5 | 37 | 20 parts |
| 7 | 100 (comparison) | 10 γ-methacryoyloxy propyl trimethoxy silane | 5.4 | 4.2 | 78 | — |
| 8 | 100 (invention) | 10 γ-methacryoyloxy propyl trimethoxy silane | 7.3 | 6.5 | 89 | 20 parts |
| 9 | 100 (comparison) | 10 n-butyl acrylate | 7.2[3] | 1.3[3] | 18 | 20 parts styrene |
| 10 | 100 (comparison) | 10 acrylic acid | 2.4[3] | 0.3[3] | 12 | 20 parts styrene |

[1]Mean particle size 400 nm; PP = polypropylene
[2]Determined by IR-spectroscopy and oxygen analysis (mean values)
[3]Percentages relate solely to the polar fractions

TABLE 2

Selected mechanical properties of glass-fibre-reinforced polypropylene compounds[4]

| | Compounds (Comparison Example) | Compound 2 (Comparison Example) | Compound 3 (Example according to the invention) |
|---|---|---|---|
| Composition of the compounds | 70 parts ungrafted PP | 60 parts ungrafted PP 10 parts acrylic-acid-grafted PP[2] | 60 parts ungrafted PP 10 parts acrylic-acid-grafted PP[3] |
| | 30 parts glass fibres[1] | 30 parts glass fibres[1] | 30 parts glass fibres[1] |
| Tensile strength DIN 54 455 MPa | 41.1 | 60.7 | 86.5 |
| Flexural strength DIN 53 452 MPa | 81.8 | 96.4 | 130 |
| Notched impact strength at 20° C. DIN 53 453 kJ/m² | 3930 | 3940 | 4130 |

[1]Short glass fibres coated with a basic size
[2]Grafting carried out without the addition of an organic solvent (degree of grafting 61%, Test 3)
[3]Grafting carried out with addition of an organic solvent (degree of grafting 98%, Test 4)
[4]The compounds were produced by extrusion at 180-250° C. in a Werner & Pfleiderer type ZSK 32 twin-screw extruder.

We claim:

1. A process which comprises the steps of
   (1) preparing an aqueous suspension which, based on 100 to 2000 parts by weight of water, contains
      (a) 100 parts by weight of particles of a polymer selected of the group consisting of crystalline homo-polypropylene and crystalline copolymers of copolymerized units of at least 70% by weight of propylene and another α-olefin,
      (b) 4 to 30 parts by weight of a polar-vinyl monomer,
      (c) based on 100 parts by weight of monomer, 0.1 to 10 parts by weight of a radical chain polymerization initiator which has a half-life of at least 2 h at a temperature of 80° to 135° C. and
      (d) 10 to 1200 parts by weight of an organic solvent which is capable of swelling polypropylene, has a boiling point at 760 Torr of at least 100° C., is miscible with the monomer in any proportion and is an aromatic hydrocarbon, an aliphatic hydrocarbon, a halogenated aromatic hydrocarbon or a mixture thereof:
   (2) heating the aqueous suspension without decomposition of the initiator of (c) to swell the polymer of (a) and permit the monomer of (b) to penetrate into said polymer and then
   (3) maintaining the aqueous suspension at a temperature of $\geq 85°$ C. until the polymerization of said monomer has ceased.

2. A process as claimed in claim 1, wherein the vinyl monomer is a $C_1$-$C_7$-alkyl acrylate, $C_1$-$C_7$-alkyl methacrylate, acrylonitrile, acrylamide, acrylic acid, methacrylic acid, glycidyl methacrylate, γ-methacryloyloxy propyl trimethoxy silane, maleic acid anhydride or a mixture thereof.

3. A process as claimed in claim 1, wherein the organic solvent is chlorobenzene, dichlorobenzene, toluene or xylene or a mixture of these solvents.

4. A process as claimed in claim 1, wherein the organic solvent is used in a quantity of 20 to 500 parts by weight based on 100 parts by weight of the polar monomer.

5. A process as claimed in claim 1, wherein the particles of said polymer are in the form of a powder having a mean particle size of from 10 to 2000 nm and a specific surface of from 0.1 to 10 m²/g.

* * * * *